United States Patent [19]
Vollmann

[11] Patent Number: 5,074,486
[45] Date of Patent: Dec. 24, 1991

[54] MAGNETIC-TAPE CASSETTE

[75] Inventor: Norbert C. Vollmann, Eindhoven, Netherlands

[73] Assignee: U.S. Philips Corporation, New York, N.Y.

[21] Appl. No.: 542,221

[22] Filed: Jun. 21, 1990

[30] Foreign Application Priority Data

Jun. 23, 1989 [NL] Netherlands .................. 8901592

[51] Int. Cl.⁵ .................................. G11B 15/60
[52] U.S. Cl. .............................. 242/199; 360/132
[58] Field of Search ............ 242/197, 198, 199, 200; 360/132, 130.21; 206/387, 389

[56] References Cited

U.S. PATENT DOCUMENTS

| | | | |
|---|---|---|---|
| 4,485,420 | 11/1984 | Schoenmakers | 360/130.21 |
| 4,564,157 | 1/1986 | Oishi et al. | 242/199 X |
| 4,593,335 | 6/1986 | Sato et al. | 242/199 X |
| 4,669,018 | 5/1987 | Oishi et al. | 242/199 X |
| 4,747,007 | 5/1988 | Ikebe et al. | 242/199 X |
| 4,780,782 | 10/1988 | Bordignon | 360/132 X |
| 4,926,278 | 5/1990 | Schoenmakers | 360/130.21 |

FOREIGN PATENT DOCUMENTS

| | | | |
|---|---|---|---|
| 2151628 | 4/1973 | Fed. Rep. of Germany | 242/199 |
| 2224344 | 11/1973 | Fed. Rep. of Germany | 242/199 |
| 2594587 | 9/1987 | France | 360/132 |
| 7809966 | 12/1978 | Netherlands | 242/199 |

*Primary Examiner*—Daniel P. Stodola
*Assistant Examiner*—John P. Darling

[57] ABSTRACT

A magnetic-tape-cassette (1) comprises tape guides (34, 35), which are arranged on a resilient element (40) and is constructed for cooperation with an apparatus (2) comprising a magnetic-head unit (4) and further tape guides (6, 7). During cooperation with the apparatus (2) the tape guides (34, 35) are situated between the further tape guides (6, 7) of the cassette. This provides an additional guidance of the magnetic tape (3) at the location of the magnetic-head unit (4), thereby improving the contact between the magnetic tape (3) and the magnetic head (5).

7 Claims, 6 Drawing Sheets

MAGNETIC-TAPE CASSETTE

BACKGROUND OF THE INVENTION

1. Field of the Invention

The invention relates to a magnetic-tape cassette comprising a housing formed with a magnetic-head opening, a magnetic tape arranged in the housing, a part of said tape extending across the magnetic-head opening, and a resilient element provided with tape guides, which element, viewed from the exterior of the housing, is situated behind the magnetic tape at the location of the magnetic-head opening, which magnetic-tape cassette is suitable for cooperation with a magnetic-tape apparatus comprising tape-transport means for transport of the magnetic tape in a longitudinal direction, magnetic-head means having a head face for cooperation with the magnetic tape in an operational situation, and further tape guides which, viewed in the direction of tape transport, are situated upstream and downstream of the magnetic-head means.

2. Description of Related Art

A magnetic-tape cassette of the type referred to above is known from U.S. Pat. No. 4,564,157. The tape guides keep the magnetic tape in a specific position in such a way that the magnetic tape does not come into contact with parts of a magnetic tape apparatus when the cassette is loaded into this apparatus. However, in the operational position the tape guides are pressed away by further tape guides of the apparatus and the tape guides are not in contact with the magnetic tape.

This prior-art cassette does not provide an improved contact between the magnetic tape and the magnetic head as in the previously proposed improvements to the well-known Compact Cassette system, which comprises cassettes as standardised in IEC publication 94 and apparatuses comprising additional tape guides for improved tape guidance, as known from European Patent Specification 0,063,398. The apparatus known from said Patent Specification comprises a magnetic-head unit having two tape guides at opposite sides of the magnetic head, which tape guides comprise a height limiter and a control element for maintaining a tape edge constantly in contact with the height limiter. In magnetic recording it is essential that during reading of signals from a magnetic tape the transducing gap of the magnetic head is inclined at the same angle (azimuth angle) relative to the magnetic tape as during recording of said signal. If these two azimuth angles differ azimuth errors arise during reading, resulting in loss of signal. The height limiters of the known apparatus ensure that the magnetic tape always occupies the same position relative to the magnetic head. For this purpose the edge of the magnetic tape should be constantly in contact with the height limiters, which is achieved by means of the control elements. These elements comprise inclined tape guide faces which press against the other edge of the magnetic tape. In order to prevent the magnetic tape from being curled or folded the tape should be wrapped around the cylindrical guide surfaces of the tape guides at a specific minimum angle. The cylindrical shape leads to an increased stiffness of the magnetic tape which reduces the likelihood of the curling or folding. Said minimum angle may not be obtained as a result of tolerances in the manufacture of the apparatus, so that the height limiters have no effect.

The prior-art construction results in the wrapping angle of the magnetic tape around the magnetic head being smaller than the wrapping angle in the absence of said tape guides. As a result of this, the tape-to-head contact becomes more critical in relation to the signal transmission and, in particular in the case of high-frequency signals, such as for example digital signals, this may give rise to transmission errors.

In a rapid-search mode of the apparatus, in which the magnetic tape is moved past the magnetic head at increased speed and in which the magnetic head occupies a partly withdrawn position, the wrapping angle of the magnetic tape around the tape guide becomes even smaller. A smaller wrapping angle leads to having an increased curling tendency of the magnetic tape, so that the height limiter fails to limit the position of the magnetic tape and azimuth errors are more likely to occur. Since in the operational position the tape guides of the prior-art cassette are not in contact with the magnetic tape this cannot lead to an improved tape-head contact.

SUMMARY OF THE INVENTION

It is an object of the invention to provide a system which yields an improved head-to-tape contact and which substantially precludes the occurrence of azimuth and transmission errors.

To this end the magnetic-tape cassette in accordance with the invention is characterized in that the element and the tape guides have such shapes that the tape guides are in contact with the magnetic tape in the operational situation during cooperation with the magnetic-tape apparatus. Since in the operational position the tape guides in the cassette are in contact with the magnetic tape, the wrapping angles of the magnetic tape around the further tape guides and around the magnetic-head means is enlarged, yielding an improved tape-to-head contact, which results in an improved signal transmission and an improved height guidance and hence less azimuth errors.

An embodiment of the magnetic-tape cassette in accordance with the invention is characterized in that viewed in the direction of tape transport the tape guides are arranged at such a distance from one another that the tape guides are situated between the further tape guides of the apparatus in the operational situation during cooperation with the apparatus. This results in the wrapping angles of the magnetic tape around the further tape guides and around the head face of the magnetic-head means being enlarged even further.

A further embodiment of the magnetic-tape cassette in accordance with the invention is characterized in that the tape guides of the cassette comprise radial projections for cooperation with the magnetic-head means of the apparatus, which projections are spaced from each other by a distance larger than the width of the magnetic tape. Now only the projections are in contact with the magnetic-head means and the tape-guide surfaces of the tape guides remain spaced from the further tape guides and the magnetic-head means, so that the magnetic tape can pass between the tape guides and the further tape guides and the magnetic head without the risk of the magnetic tape becoming jammed. Since the projections are also situated at said distance from each other, the magnetic tape can not become stuck between the projections.

Yet another embodiment of the magnetic-tape cassette in accordance with the invention is characterized in that during cooperation with the magnetic-head means the projections are positioned in such a way that the projections are out of contact with the magnetic tape. This enables the magnetic tape to cooperate freely with the tape guides of the magnetic-head unit and in particular with the height limiters and the control elements of the magnetic-head unit, which promotes a correct operation of the system.

Yet another embodiment of the system in accordance with the invention is characterized in that the resilient element keeps the projections in contact with the magnetic-head means both in a recording/reproducing mode and in a partly withdrawn position of the magnetic-head means relative to the cassette. Thus, in the operational position, the projections of the tape guides of the cassette are urged against the magnetic-head means in the apparatus, so that always a correct positioning of the tape guides relative to the magnetic-head means is obtained, even when the magnetic head is partly withdrawn.

A favourable embodiment of the magnetic-tape cassette in accordance with the invention is characterized in that the tape guides with the projections are interconnected by two bridge portions and in that a blade spring is secured to each tape guide. This construction enables the resilient element with the tape guides to be manufactured simply as an integral unit.

To enable a pressure felt to cooperate with the magnetic tape, in a further favorable embodiment an opening is formed between the bridge portions and the tape guides which is large enough to allow the passage of a felt arranged on a further resilient element in the housing. This enables an independently suspended felt to be used in the cassette.

BRIEF DESCRIPTION OF THE DRAWINGS

Embodiments of the magnetic-tape cassette in accordance with the invention will now be described in more detail, by way of example, with reference to the Figures. In the Figures.

DETAILED DESCRIPTION OF THE PREFERRED EMBODIMENTS

Figure 1:
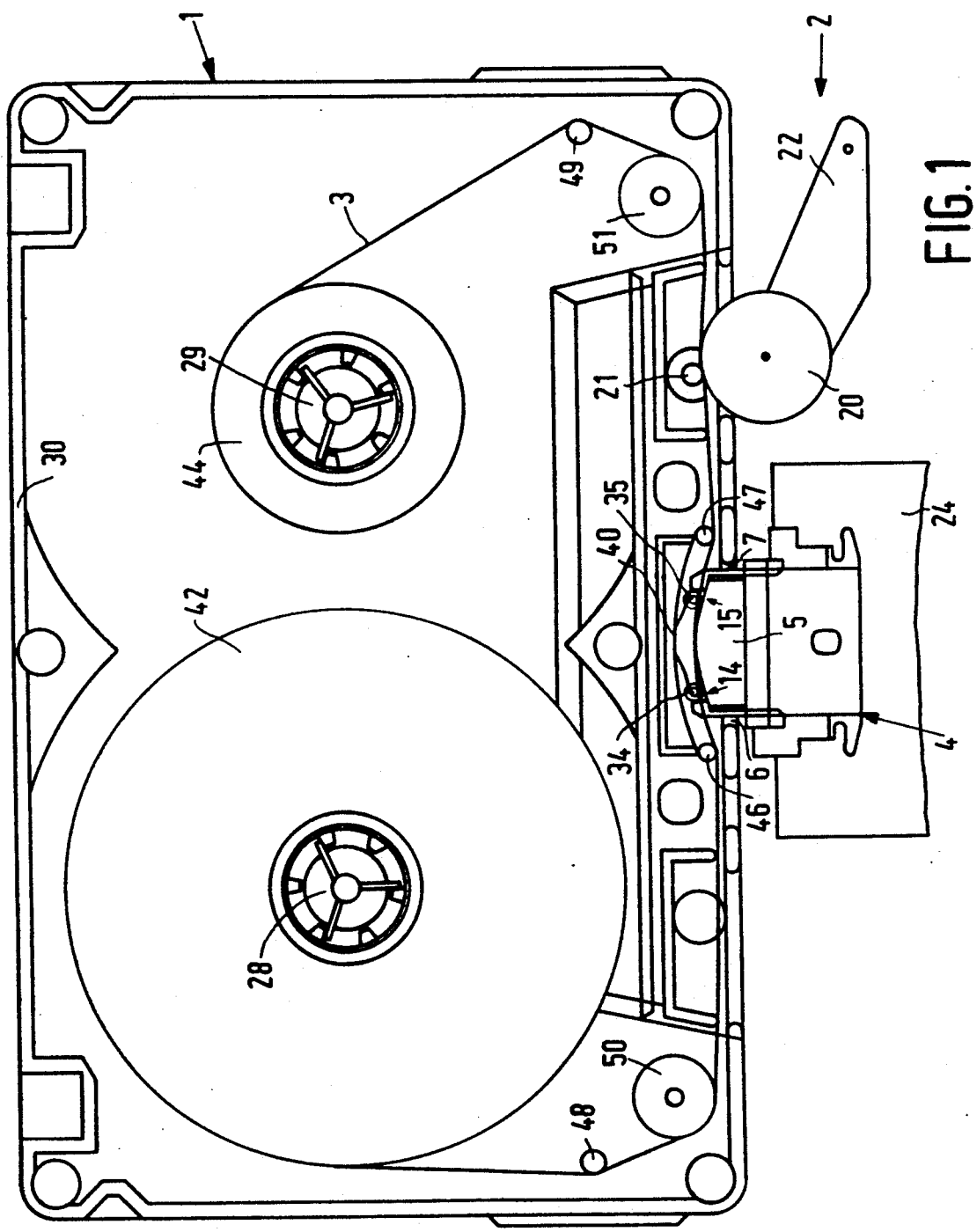
FIG. 1 is a sectional view of an embodiment of a magnetic-tape cassette in accordance with the invention, which cooperates with parts of an apparatus.

FIG. 1 shows an embodiment of the magnetic-tape cassette 1 in accordance with the invention which cooperates with a magnetic-tape apparatus 2, of which only the parts which cooperate with the cassette are shown. The cassette 1 comprises a housing 30 accommodating a magnetic tape 3 which is wound on reels 42, 44 and which is guided by guide pins 46, 47, 48 and 49 and by guide rollers 50 and 51. The reels are driven by drive spindles 28 and 29 and transport of the magnetic tape 3 is achieved by a combination of a capstan 21 and a pressure roller 20. The pressure roller is pressed against the capstan by means of an arm 22 carrying the pressure roller.

For reading and writing information on the magnetic tape, the magnetic tape cooperates with magnetic-head means 4 of the apparatus 2, which means are arranged on a head support 24. The magnetic-head means comprise a magnetic-head unit 4 which can be inserted through an opening 32 in the housing 30 of the cassette 1 (see FIGS. 2 and 3). For a correct guidance of the magnetic tape 3 at the location of the magnetic head 5 of the magnetic-head unit 4 this unit comprises further tape guides 6 and 7 and the cassette 1 comprises tape guides 34, 35, which are pressed against stops 14, 15 of the magnetic-head unit 4 by means of a resilient element 40.

Figure 2:
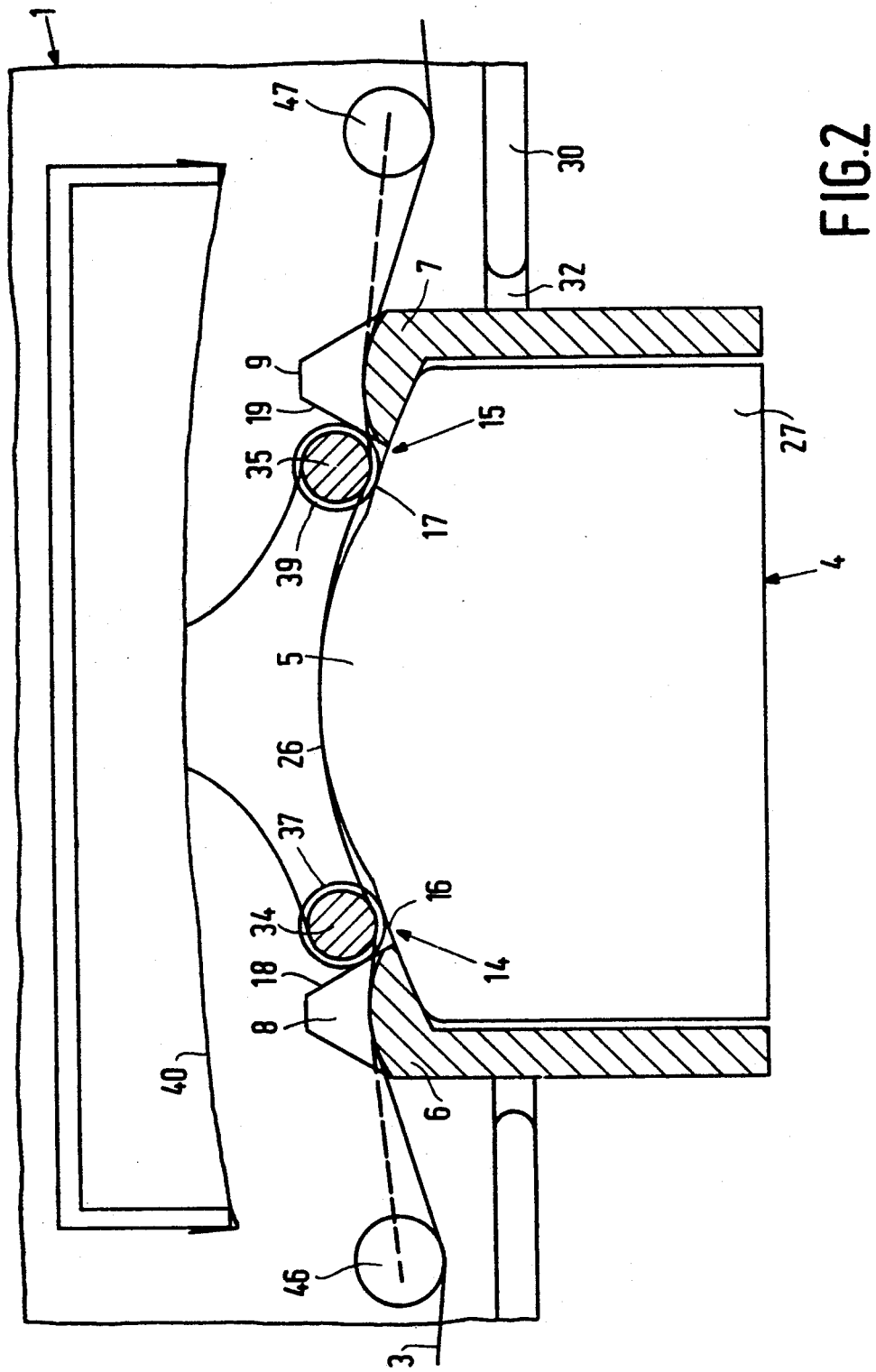
FIG. 2 is a sectional view of a magnetic-head unit of the apparatus, which unit is situated partly in the cassette to cooperate with a magnetic tape.
Figure 3:
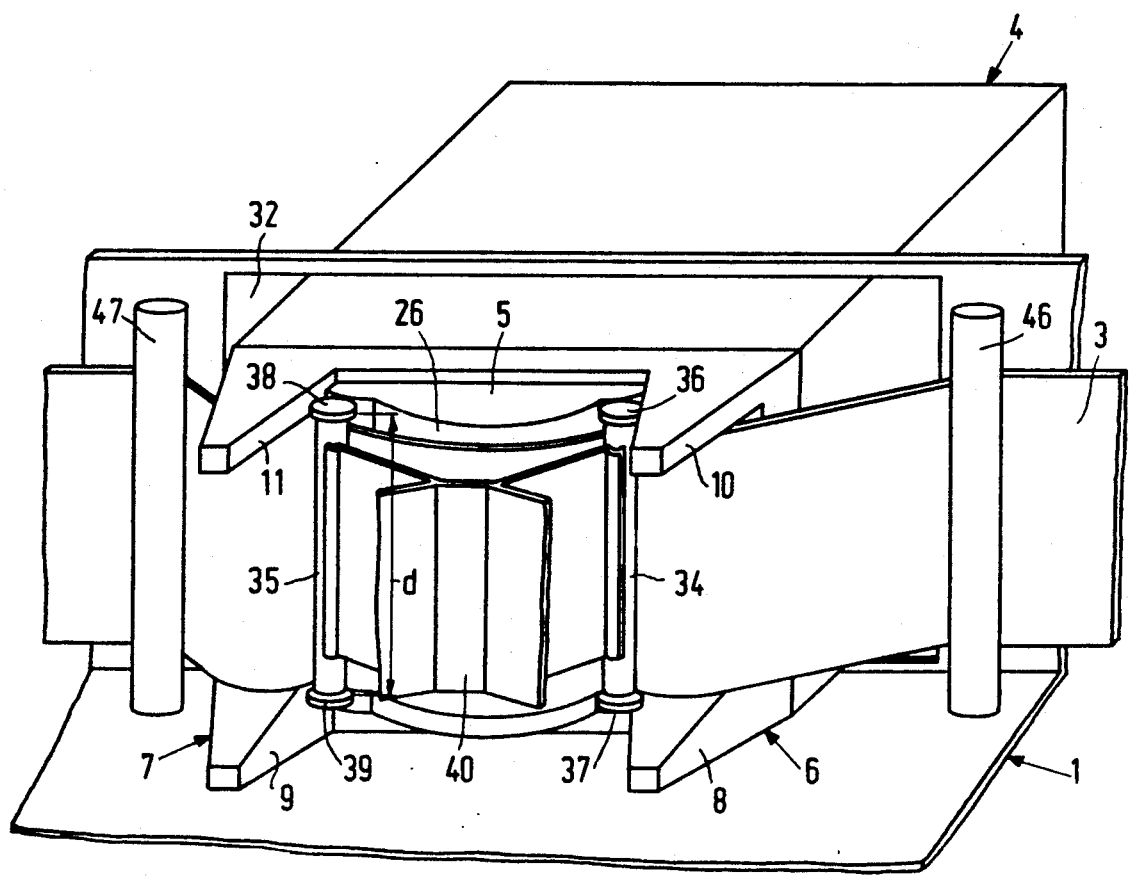
FIG. 3 shows a magnetic head with further tape guides cooperating with tape guides and with a magnetic tape of the magnetic-tape cassette.

FIGS. 2 and 3 show in detail how the magnetic tape 3 is guided at the location of the magnetic-head unit 4. The further tape guides 6, 7 comprise height limiters 10 and 11 and control elements 8, 9. These control elements, which in the present case are constituted by inclined guide walls 8, 9, bring the magnetic tape 3 in contact with the height limiters 10, 11. When the further tape guides 6, 7 comprising height guides and control elements are arranged at opposite sides of the magnetic head 5, the position of the magnetic tape 3, in particular the level of the tape relative to the magnetic head and the angle between the tape edge and the magnetic head, are defined accurately. The cassette 1 also comprises tape guides 34 and 35 for an improved guidance of the magnetic tape 3.

These tape guides 34, 35 are pressed against stops 14, 15 (see FIG. 2) in the apparatus 2 by means of a resilient element 40. These stops 14, 15 are constituted by walls 16, 17 of the housing 27 of the magnetic head adjoining the head face 26 of the magnetic head 5 and by wall portions 18, 19 of the further tape guides 6, 7 (see FIG. 2). In order to ensure that the magnetic tape 3 cannot become stuck between the tape guides 34, 35 and the stops 14, 15 the tape guides 34, 35 are formed with radial projections 36, 37, 38, 39 (see FIGS. 2 and 3) adapted to cooperate with the stops 14, 15.

FIG. 3 shows clearly that the edges of the magnetic tape 3 are spaced from the projections 36, 37, 38 and 39 of the tape guides 34, 35. This is possible in that the distance between the projections 36 and 37 and the distance d between the projections 38 and 39 is larger than the maximum width of the magnetic tape 3. The maximum width of the magnetic tape 3 is to be understood to mean the maximum width within the width tolerances of the magnetic tape as laid down in IEC publication 94. The projections 36, 37, 38 and 39 should cooperate with the magnetic-head unit 4 in such a way that the magnetic tape 3 can cooperate freely with the height limiters 10, 11 and the control elements 8, 9 of the tape guides 6, 7. This is achieved in that the projections 36 and 38 cooperate with the stops of the magnetic-head unit 4 above the height-limiting faces of the height limiters 10, 11 and in that the projections 37 and 39 cooperate with said stops below the inclined walls of the control elements 8, 9.

Figure 4:
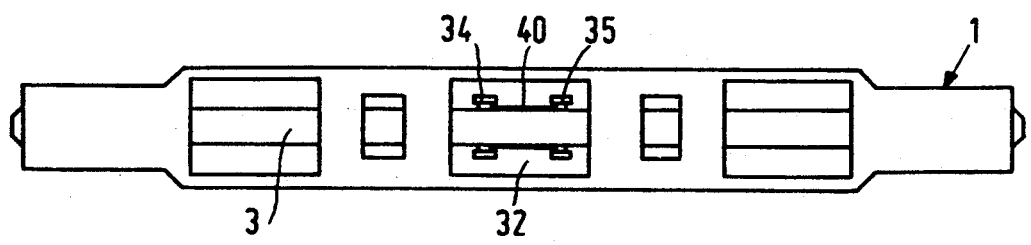
FIG. 4 is a front view of the magnetic-tape cassette.

FIG. 4 is a front view of the cassette 1. The resilient element 40 carrying the tape guides 34, 35 is arranged behind the magnetic tape 3 at the location of the opening 32.

Figure 5A:
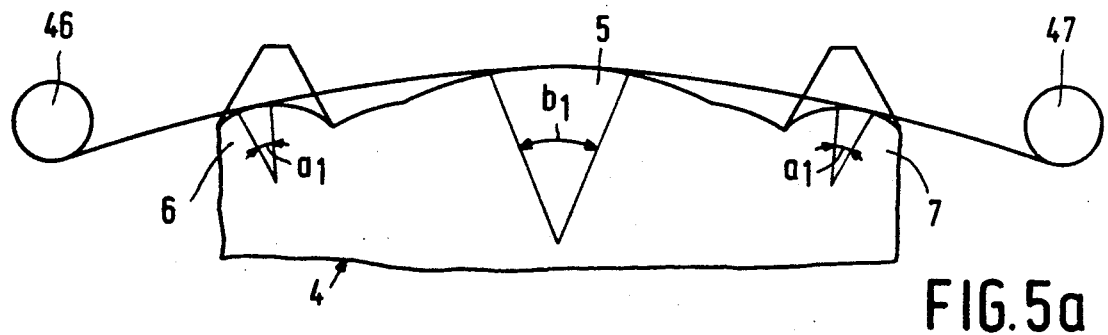
FIGS. 5a and 5b illustrate how the magnetic tape guide is guided at the location of the magnetic head and the further tape guides, showing the wrapping angles in a normal recording/reproducing mode and in a rapid-search mode.
Figure 5B:
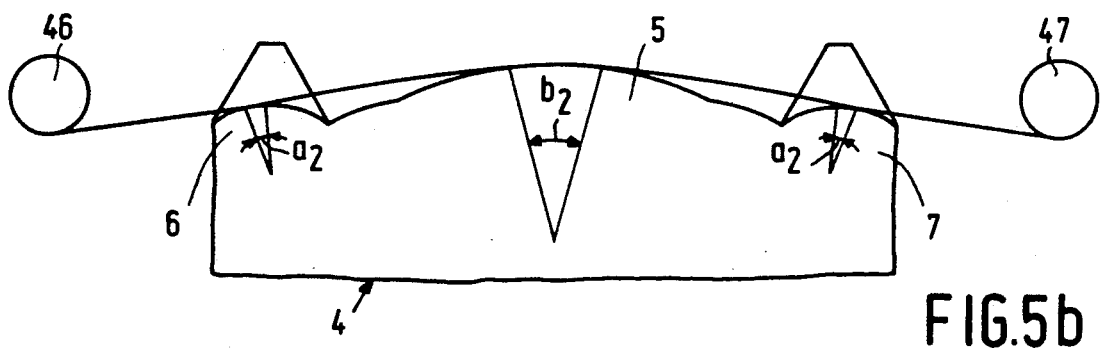

For a correct operation of the further tape guides 6 and 7 and for a correct signal transmission between the magnetic tape 3 and the magnetic head 5, the magnetic tape 3 must be effectively in contact with the further tape guides 6, 7 and with the magnetic head 5. FIGS. 5a and 5b illustrate the contact between the magnetic tape and the further tape guides and the magnetic head. In the normal recording/reproducing mode (FIG. 5a) the magnetic tape is in contact with the tape guides 6, 7 and the magnetic head 5 over a wrapping angle $a_1$ and $b_1$ respectively and in a rapid-search mode (FIG. 5b), in which the magnetic head 5 is partly withdrawn and the magnetic tape 3 is moved past the magnetic head at a higher speed and the magnetic tape is in contact with the further tape guides and the magnetic head over a wrapping angle $a_2$ and $b_2$ respectively. In the rapid-search mode these wrapping angles $a_2$, $b_2$ decrease considerably, so that the correct operation of the further tape guides 6, 7 and the signal transmission between the magnetic head and the magnetic tape becomes critical.

In order to increase the wrapping angles $a_1$, $a_2$ and $b_1$, $b_2$ around the further tape guides 6, 7 and the magnetic head 5 respectively, both in the normal recording/reproduction mode and in the rapid-search mode, tape guides 34, 35 are arranged in the cassette 1.

Figure 6A:
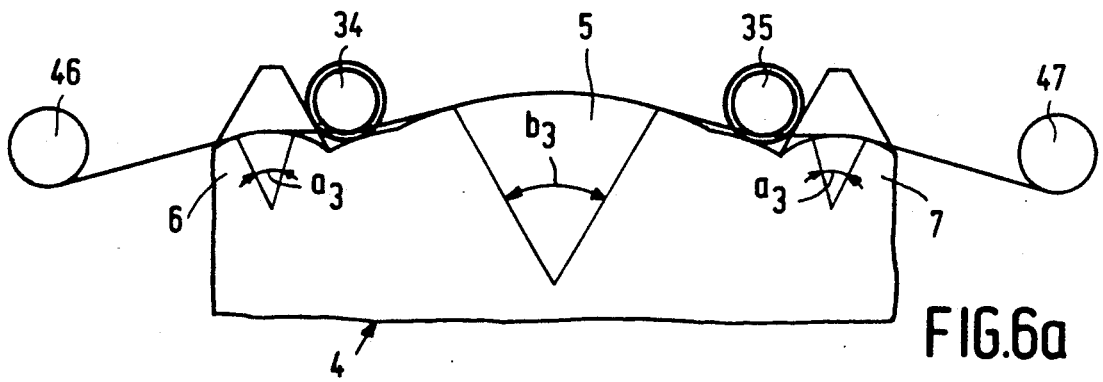
FIGS. 6a and 6b show the tape guidance by the tape guides in the construction in accordance with the invention.
Figure 6B:
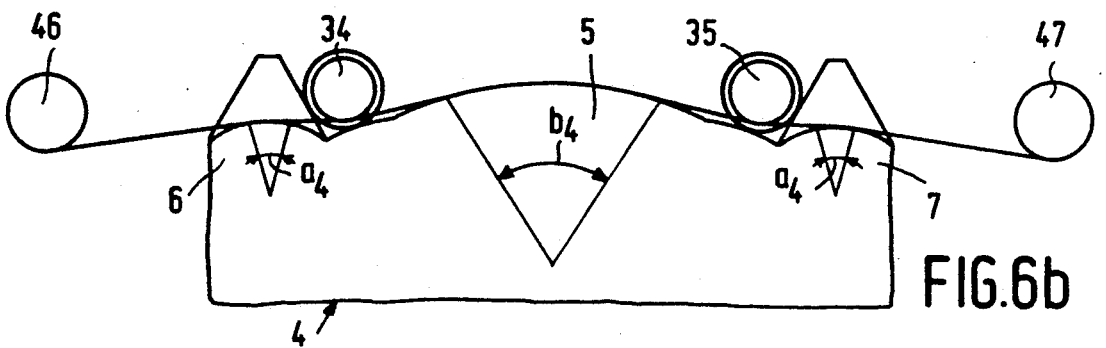

As is shown in FIG. 6a the tape guides 34, 35 ensure that the wrapping angles $a_3$ and $b_3$ in the normal recording/reproducing mode are enlarged considerably in comparison with the construction without these tape guides (see FIG. 5a). Since the tape guides 34, 35 are pressed against the stops 14, 15 by a resilient element 40 (see FIGS. 1 and 2) the tape guides 34, 35 remain in contact with the stops 14, 15 even in the case of a partly withdrawn magnetic head 5 (see FIG. 6b). In this rapid-search mode the wrapping angle $b_4$ even does not change relative to the normal recording/reproducing mode (FIG. 6a), the wrapping angles $a_4$ decrease slightly relative to the normal recording/reproduction mode but increase considerably in comparison with the construction without said tape guides 34, 35 (FIG. 5b).

Figure 7:
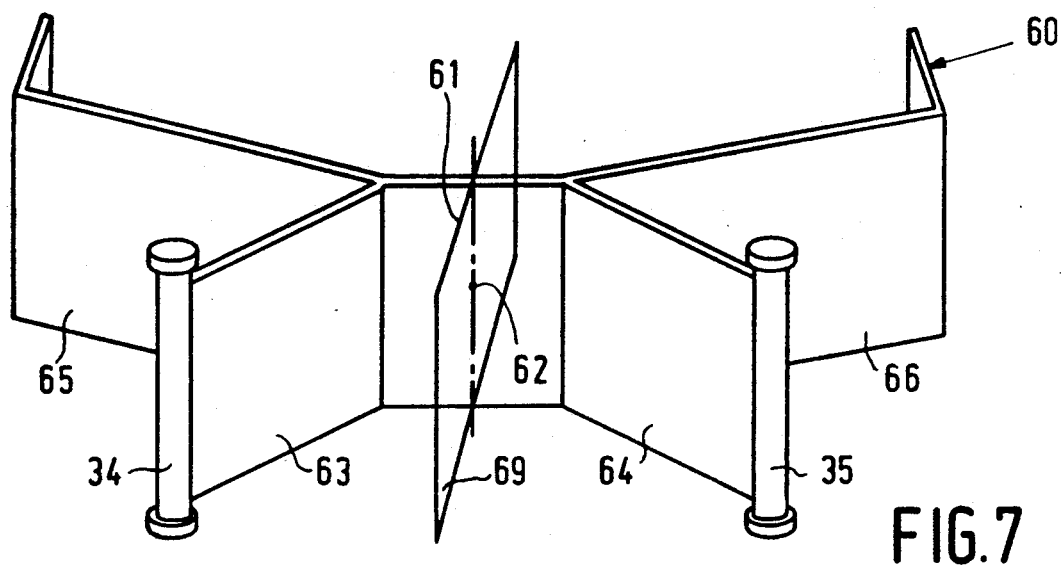
FIG. 7 shows a first example of a resilient element carrying tape guides suitable for use in the magnetic-tape cassette.

FIG. 7 shows a first example of the resilient element carrying the tape guides 34, 35. The resilient element is constituted by a blade spring 60 comprising a central blade 61 having a centre 62 and four blade-spring arms 63, 64, 65 and 66, which extend in a direction away from the centre 62. The blade-spring arms 63 and 64 are connected to the tape guides 34 and 35 and the other blade spring arms 65 and 66 have bent portions at their free ends to secure them in the cassette.

Figure 8:
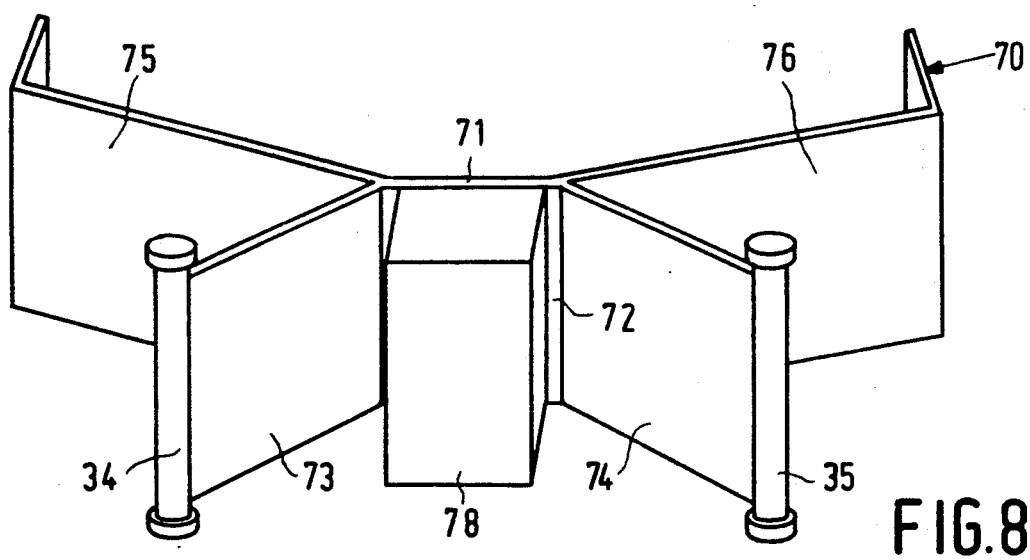
FIG. 8 shows the resilient element provided with a felt.

FIG. 8 shows an alternative resilient element. Again the blade spring arms 73 and 74 of the blade spring 70 carry the tape guides 34 and 35 and the blade spring arms 75 and 76 have bent end portions. However, the central blade 71 is now provided with a felt 78 for pressing the magnetic tape against the magnetic head. This felt 78 is arranged on the same side 72 of the centre blade 71 where the tape guides 34, 35 are situated.

Figure 9:
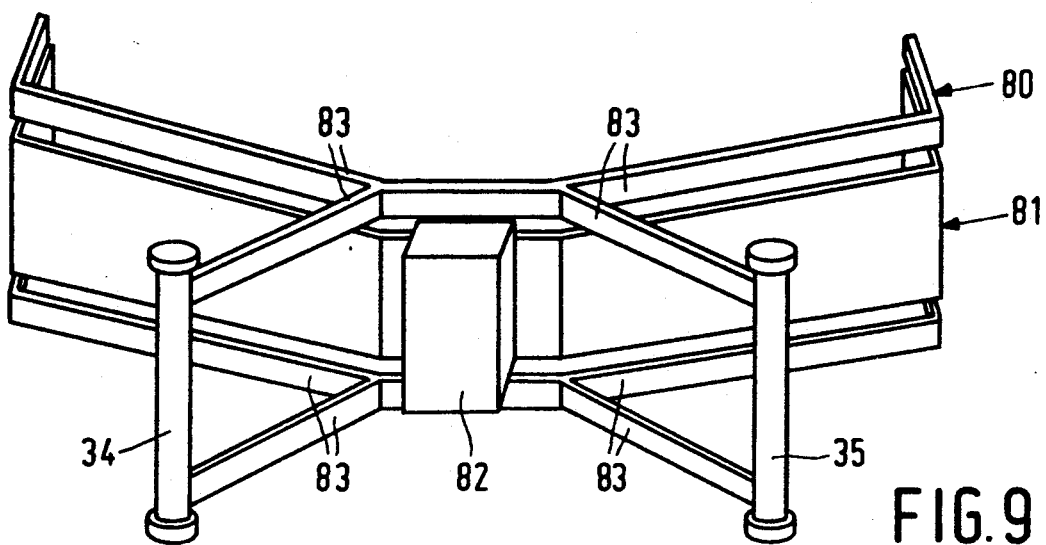
FIG. 9 shows a second example of a resilient element carrying tape guides and a further resilient element with a felt.

FIG. 9 shows a second example of the resilient element 80. Here the blade-spring arms are replaced by resilient arms 83 which are spaced from each other. Between these resilient arms a further resilient element 81 is arranged on which a felt 82 is mounted. As a result of the presence of these two resilient elements 80 and 81 the tape guides 34, 35 can move independently of the felt 82.

In all these constructions of the resilient element the resilient element is symmetrical relative to a plane 69 normal to the central blade 61 and parallel to the tape guides 34, 35 (see FIG. 7).

Figure 10:
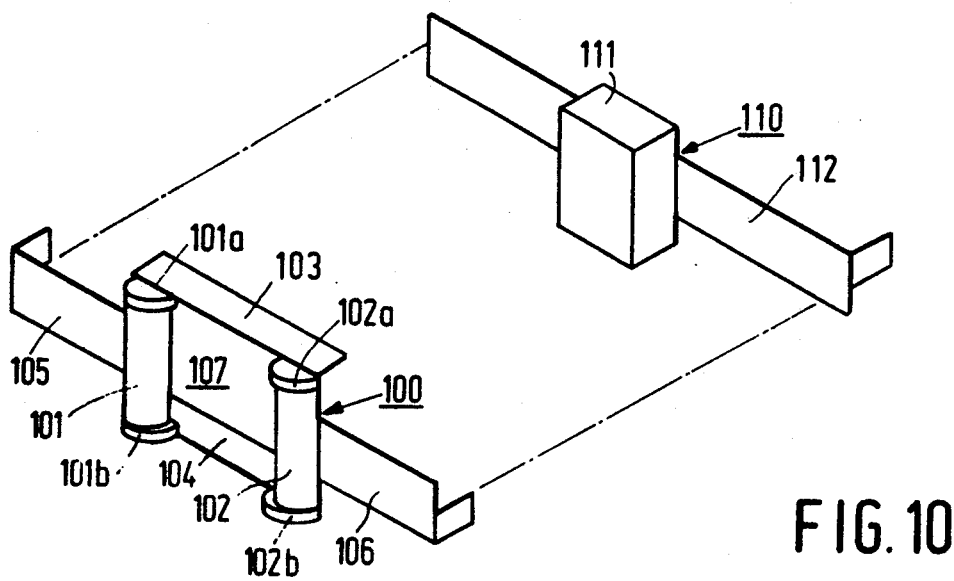
FIG. 10 shows a third example of a resilient element and the further resilient element with the felt.

FIG. 10 shows a third example of the resilient element 100, which may be arranged in the magnetic-tape cassette together with a further resilient element 110. This resilient element 100 has two tape guides 101 and 102, each comprising two radial projections 101a, 101b and 102a, 102b. The tape guides are connected to their projections by bridge portions 103 and 104. A blade spring 105, 106 is arranged on each tape guide to provide resilience. Between the tape guides 101 and 102 and the bridge portions 103 and 104 an opening 107 is formed, which is large enough to allow the passage of a felt 111 of the further resilient element 110. The felt is supported independently by a further spring 112.

Figure 11:
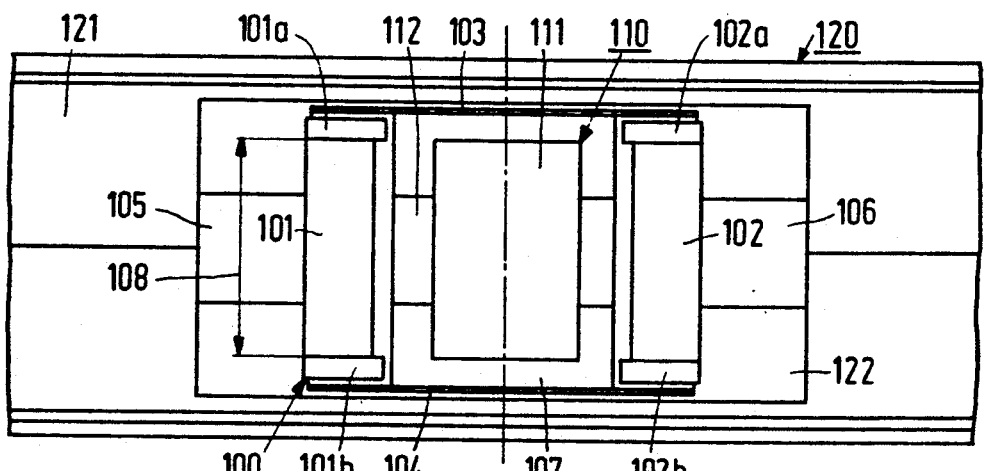
FIG. 11 shows the cassette without magnetic tape and with the resilient elements shown in FIG. 10.
Figure 12:
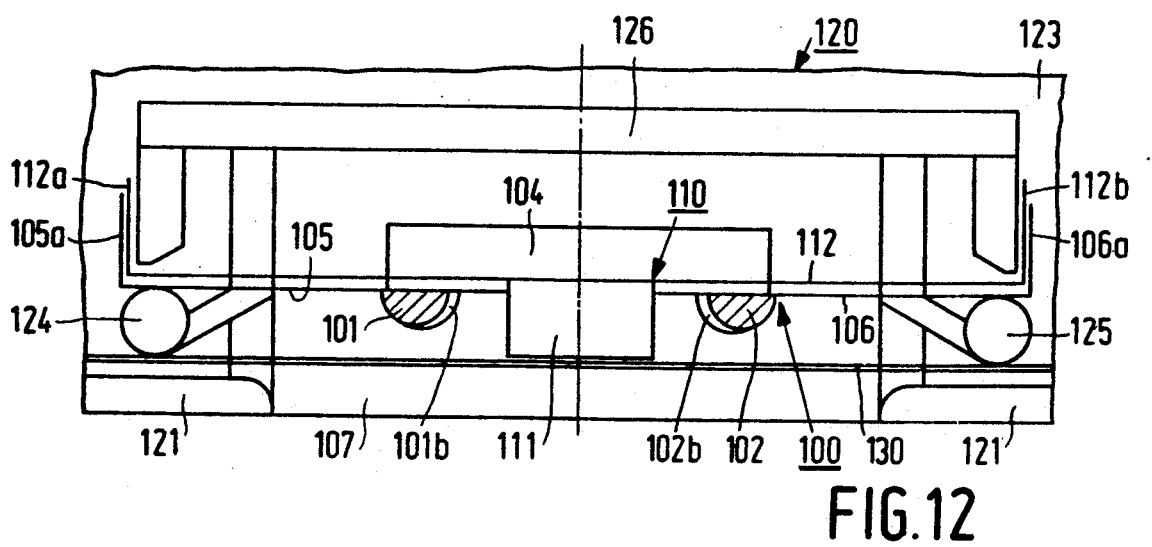
FIG. 12 is a sectional view of the part of the cassette shown in FIG. 11.

FIG. 11 shows a front wall 121 of an embodiment of the magnetic-tape cassette 120 in accordance with the invention. The front wall 121 has a magnetic-head opening 122 for the passage of magnetic-head means during use in an apparatus. The projections 101a and 101b are spaced from one another at a distance 108 larger than the maximum width of a magnetic tape, not shown for the sake of clarity, so that the magnetic tape is not in contact with the projections. The further resilient element 110 is situated behind the resilient element 100. The felt 111 projects from the opening 107, as is shown in FIG. 12. FIG. 12 shows a lower cassette half 123, comprising fixed tape guides 124 and 125 and a partition 126. The blade springs 105, 106 and 112 of the resilient element 100 and of the further resilient element 110 are arranged between the fixed tape guides and the partition. Bent end portions 105a, 106a, 112a and 112b of the blade springs ensure that the elements are retained in their correct positions inside the cassette 100. Viewed from the outside the resilient element 100 is situated behind the magnetic tape 130 at the location of the opening 107.

It will be evident that the invention is not limited to the embodiments of the magnetic-tape cassette shown herein. For example, for the resilient element in the cassette other constructions can be used than that of the resilient element shown herein.

I claim:

1. A magnetic-tape cassette for use in combination with magnetic-tape recording/reproducing apparatus including tape-transport means for transporting a magnetic tape in a longitudinal direction, magnetic-head means for recording and reproducing information on the tape and including a head face for cooperation with the magnetic tape during recording/reproducing, and apparatus tape guides which, viewed in the direction of tape transport, are situated before and after the magnetic-head means, the cassette comprising:

a housing formed with a magnetic-head opening, a magnetic tape arranged in the housing, a part of said tape extending across the magnetic-head opening, and a resilient element provided with cassette tape guides before and after said magnetic-head means, which element, viewed from the exterior of the housing, is situated behind the magnetic tape at the location of the magnetic-head opening, the element and the cassette tape guides having such shapes that the cassette tape guides are in contact with the magnetic tape during recording/reproducing to urge the tape towards the magnetic-head means.

2. A magnetic-tape cassette as claimed in claim 1, in which viewed in the direction of tape transport the cassette tape guides are arranged at such a distance from one another that the cassette tape guides are situated between the apparatus tape guides during recording/reproducing cooperation with the apparatus.

3. A magnetic-tape cassette as claimed in claim 1, in which the cassette tape guides comprise radial projections for cooperation with the magnetic-head means of the apparatus, which projections are spaced from each other by a distance larger than the width of the magnetic tape.

4. A magnetic-tape cassette as claimed in claim 3, characterized in that during cooperation with the magnetic-head means the projections are positioned in such a way that the projections are out of contact with the magnetic tape.

5. A magnetic-tape cassette as claimed in claim 3, characterized in that the resilient element keeps the projections in contact with the magnetic-head means both in a recording/reproducing mode and in a partly withdrawn position of the magnetic-head means relative to the cassette.

6. A magnetic-tape cassette as claimed in claim 3, in which the cassette tape guides with the projections are interconnected by two bridge portions and comprising a blade spring is secured to each tape guide.

7. A magnetic-take cassette as claimed in claim 3 an opening between the bridge portions and the cassette tape guides which opening is formed which is large enough to allow the passage of a felt arranged on a further resilient element in the housing.

* * * * *